US009229444B2

(12) United States Patent
Baierl-Moehler et al.

(10) Patent No.: US 9,229,444 B2
(45) Date of Patent: Jan. 5, 2016

(54) NUMERICAL CONTROL (NC) PROGRAM AND PROCESS FOR SIMPLIFIED REPRODUCTION ON A MACHINE TOOL

(71) Applicant: TRUMPF Werkzeugmaschinen GmBH + Co. KG, Ditzingen (DE)

(72) Inventors: Monika Baierl-Moehler, Nussdorf (DE); Klaus Bauer, Ditzingen (DE); Sascha Brandt, Weil der Stadt (DE); Mirko Donatzer, Rutesheim (DE); Goetz Nothdurft, Stuttgart (DE); Hans-Joerg Schmid, Gerlingen (DE); Thomas Wolf, Bietigheim-Bissingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 447 days.

(21) Appl. No.: 13/657,167

(22) Filed: Oct. 22, 2012

(65) Prior Publication Data

US 2013/0066447 A1 Mar. 14, 2013

Related U.S. Application Data

(63) Continuation-in-part of application No. PCT/EP2011/055663, filed on Apr. 12, 2011.

(30) Foreign Application Priority Data

Apr. 22, 2010 (DE) .......................... 10 2010 028 135

(51) Int. Cl.
G05B 11/01 (2006.01)
G05B 19/4093 (2006.01)
(52) U.S. Cl.
CPC ... *G05B 19/40938* (2013.01); *G05B 2219/35005* (2013.01); *G05B 2219/36261* (2013.01); *G05B 2219/36273* (2013.01); *G05B 2219/45234* (2013.01)

(58) Field of Classification Search
CPC ............... G05B 19/40938; G05B 2219/35005; G05B 2219/45234; G05B 2219/36273; G05B 2219/36261
USPC .......... 700/18, 86–87, 88, 159–160, 181, 253
See application file for complete search history.

(56) References Cited

U.S. PATENT DOCUMENTS 4,920,500 A * 4/1990 Hetland et al. ................. 700/251
4,998,206 A * 3/1991 Jones et al. ..................... 700/96
(Continued)

FOREIGN PATENT DOCUMENTS

DE 19856116 A1 6/2000
EP 0939356 A2 9/1999
(Continued)

OTHER PUBLICATIONS

STEP NC-The End of G-codes?, Mar. 2006, pp. 1-7, Mark Albert.*
(Continued)

*Primary Examiner* — Ramesh Patel
(74) *Attorney, Agent, or Firm* — Fish & Richardson P.C.

(57) ABSTRACT

A computer-implemented method is described, comprising receiving data that represents a workpiece part type to be produced on a machine tool for machining flat starting materials. The method includes preparing a first numerical control program which is adapted for producing the workpiece part type from a flat starting material on the machine tool, and attaching one or more extractable data sets prepared from the received data to the first numerical control program, wherein the extractable data sets represent one or more parameters including the tools, tool steps and associated machining parameters for producing a single workpiece the workpiece part type on the machine tool. The method further includes extracting the extractable data sets from the attached first numerical control program for adjusting the one or more parameters, integrating the adjusted one or more parameters into a second numerical control program; and providing the second numerical control program to the machine tool.

32 Claims, 6 Drawing Sheets

(56) References Cited

U.S. PATENT DOCUMENTS

| | | | |
|---|---|---|---|
| 5,327,350 A * | 7/1994 | Endo | 700/179 |
| 5,453,933 A * | 9/1995 | Wright et al. | 700/181 |
| 5,572,103 A * | 11/1996 | Terada | 318/568.13 |
| 5,798,928 A * | 8/1998 | Niwa | 700/180 |
| 5,917,726 A * | 6/1999 | Pryor | 700/95 |
| 5,949,683 A * | 9/1999 | Akami et al. | 700/123 |
| 5,971,589 A * | 10/1999 | Hazama et al. | 700/145 |
| 6,233,538 B1 * | 5/2001 | Gupta et al. | 703/6 |
| 6,420,674 B1 * | 7/2002 | Cole et al. | 219/121.67 |
| 6,445,972 B1 * | 9/2002 | Takegahara et al. | 700/162 |
| 6,556,886 B1 * | 4/2003 | Riva et al. | 700/162 |
| 7,661,073 B2 | 2/2010 | Lausterer et al. | |
| 2004/0083023 A1 | 4/2004 | Suh et al. | |
| 2004/0186759 A1 * | 9/2004 | Fukui et al. | 705/7 |
| 2005/0107908 A1 * | 5/2005 | Onoue et al. | 700/180 |
| 2005/0171629 A1 | 8/2005 | Suh et al. | |
| 2006/0059447 A1 * | 3/2006 | Ariyama et al. | 716/10 |
| 2009/0108792 A1 * | 4/2009 | Fagan | 318/568.1 |
| 2010/0063608 A1 * | 3/2010 | Miller | 700/97 |
| 2011/0046766 A1 * | 2/2011 | Mienhardt et al. | 700/103 |
| 2011/0156304 A1 * | 6/2011 | Walker et al. | 264/219 |
| 2013/0190918 A1 * | 7/2013 | Matsubara et al. | 700/159 |
| 2013/0199014 A1 * | 8/2013 | Buettner et al. | 29/407.08 |

FOREIGN PATENT DOCUMENTS

| | | |
|---|---|---|
| EP | 2105815 A1 | 9/2009 |
| JP | 1993000388 | 1/1993 |
| JP | H06142954 A | 5/1994 |
| JP | 06320388 A | 11/1994 |
| JP | H07200021 A | 8/1995 |
| JP | 2003058215 A | 2/2003 |
| JP | 2005128851 A | 5/2005 |
| WO | WO03023545 A3 | 12/2003 |

OTHER PUBLICATIONS

Norm ISO, 14649-1, "Industrial automation systems and integration—Physical device control—Data model for computerized numerical controllers—Part 1: Overview and fundamental principles", Mar. 1, 2003, 36 pages.

Notification of Transmittal of the Translation of the International Preliminary Report on Patentability for corresponding PCT Application No. PCT/EP2011/055663, mailed Nov. 1, 2012, 11 pages.

* cited by examiner

NUMERICAL CONTROL (NC) PROGRAM AND PROCESS FOR SIMPLIFIED REPRODUCTION ON A MACHINE TOOL

CROSS REFERENCE TO RELATED APPLICATIONS

This application is a continuation-in-part of and claims priority under 35 U.S.C. §120 to PCT Application No. PCT/EP2011/055663 filed Apr. 12, 2011, which claimed priority to German Application No. 10 2010 028 135.2, filed Apr. 22, 2010. The contents of both of these priority applications are hereby incorporated by reference in their entirety.

TECHNICAL FIELD

The invention relates to a numerical control (NC) program for a machine tool for machining flat starting materials (e.g., metal sheets) as well as to a process for preparing a new NC reproduction program for one or more workpiece parts that are to be reproduced on the machine tool.

BACKGROUND

The control of machine tools is often carried out with the aid of numerical controls, which are generally divided into three control units, an MMC operating system (Man Machine Communication) as data input and visualization unit, an SPC control unit (stored program control) and an NC (Numerical Control) control unit. Data and control commands are entered via the MMC operating system, forwarded to the NC control unit, decoded in the NC control unit, and processed further separated according to geometrical and technological data (NC control unit) and switch commands (SPC control unit). The NC and SPC control units transmit the current machine status to the MMC control unit for visualization.

Shop-floor programming and reproduction have played a major role in the machine tool field for a long time. Owing to the complexity of machining by means of machine tools, errors in the production sequence repeatedly occur. For example, during laser machining, poorly or incompletely cut workpiece parts can be produced as a result of an incorrect focal position, or, when using signing or punching tools, the imprinted signature may be too weak or too strong owing to an incorrect vertical adjustment. In that case it is necessary to produce the defective parts again in good quality once the error has been eliminated, in order to enable the machining task to be completed correctly. It is also possible for the customer to increase the required number of workpiece parts after the NC program for the machining has already been forwarded from the CAD/CAM (Computer Aided Design and Computer Aided Manufacturing) programming system to the machine tool. In order to produce these outstanding workpiece parts, the software engineer of the CAD/CAM programming system can be given the task of inserting the missing workpiece parts into a later machining task. Because machine tools often have a large number of machining tasks in the queue, it is possible that completion of the customer's order will be delayed. It is therefore important for the operator to have the possibility of shop-floor programming so that he can program and start immediate reproduction himself.

It is known from the prior art that the operator of a machine tool, in particular of a laser machine, a punching machine or a combined laser/punching machine, accesses a computer with an installed CAD/CAM programming system via a network connection and there again executes all the steps for programming a new sheet-metal plate with workpiece parts. The operator first opens, for example, a remote desktop connection to the network computer and there starts the CAD/CAM programming system. He then indicates the type of sheet-metal plate he would like to use for the machining, that is to say the material and the thickness, and subsequently searches for the data with the geometries of the individual parts that are to be produced again. He must ensure, especially when producing very similar parts, that he selects the part with the correct dimensions. As soon as he has found the parts, he indicates how many of them he would like to produce again and nests them on the plate, that is to say arranges them on the sheet-metal plate, either manually or automatically with the aid of a nesting program in as space-saving a manner as possible. The machining steps for producing the good parts and their mode of discharge can subsequently likewise be chosen manually or automatically, that is to say it is chosen which tools, for example differently shaped punching tools and/or lasers, are used for machining the metal sheet. In the case of punching in particular, a large number of differently shaped tools can be used to produce the same good part.

The sequence of the machining is also critical, because it determines whether automatic discharge is possible or not. For example, it must be ensured that, in the last machining step, the separation of the workpiece part, that part comes to lie on a discharge flap or beneath the punching or laser head so that it can be reached by the operator or a discharge device.

When the machining sequence and the mode of discharge have been established for all the good parts, the CAD/CAM programming system generates a new NC program for reproduction. This NC reproduction program must then be transferred via the network connection from the computer of the CAD/CAM programming system to the control computer of the machine tool and started for renewed execution.

For a machine operator at the machine tool, this process can be carried out only with difficulty, because the operator in some cases has only limited operating possibilities, for example by a touch screen instead of a mouse and keyboard, and such a MMC (man-machine communication) operating system is generally also not designed for carrying out lengthy office work.

It is known from the prior art (e.g. U.S. Pat. No. 7,661,073 B2) to adapt the operating elements of the MMC operating system in order to simplify the operating modes, which are limited or executed differently than in an office computer, in their application. In EP 0642066 A1, a programming system for a machine tool was improved in that the construction of the programming system was dialogue-oriented. This simplifies the work of the operator if, for example, only a touch screen is available for inputting, or the operator is not very familiar with the complex programming system. Despite these improvements, however, an operator has for decades had to repeat substantially the complete working sequence for programming a sheet-metal plate if he wanted to prepare a new NC program for reproduction.

The system and methods described herein can advantageously make the preparation of new NC reproduction programs immediately after the actual production quicker for the operator and can reduce sources of error.

SUMMARY

An NC program is provided which has for each of the different workpiece parts that it can produce an extractable data set, in particular an individual part NC code, in which there is stored all the information relating to the tools and tool steps to be used and the associated machining parameters that is necessary for the production of such an individual workpiece part. If reproduction is necessary, the majority of the information required for preparing an NC reproduction program is already present in the form of NC data in the case of individual part NC codes. Accordingly, only a small part of the NC program for reproduction must be newly prepared, because there are already NC codes for the machining steps of each workpiece that is to be reproduced. These NC codes can, if desired, be processed, for example in order to adapt the angular position or disposal. A large part of the NC reproduction program can be obtained, however, by simply combining individual part NC codes. Because in most cases a small number of workpiece parts are manufactured for reproduction, the time-consuming preparation of a time-optimized NC reproduction program according to the prior art is not typically worthwhile. Furthermore, the machine operator can select the workpiece parts for reproduction more quickly and easily from the limited number of different workpiece parts that are contained in the current NC program as extractable data sets, or individual part NC codes, than if he has to search for them in the CAD data files, possibly from a large number of similar workpiece part geometry data. Certain alternative solutions for preparing an NC reproduction program from an NC program according to the prior art are substantially more difficult to implement. Even the identification of the produced good parts on the sheet-metal plate would fail because, without additional information, it is often not possible to definitely ascertain which produced workpiece parts are good parts and which are waste, in particular when the workpiece parts have open contours, are nested in one another, or are provided with common separating cuts. Using the systems and methods described herein, the machine operator does not have to use CAD programming to prepare the NC reproduction program.

Identification of the good parts for reproduction is advantageously facilitated for the machine operator in that the extractable data sets in principle have a closed outer contour for machining, as a result of which the identification of good parts and waste is simplified and also is clear. It is advantageous if workpiece part geometry data for each extractable data set or individual part NC code are additionally added to the NC program, as a result of which identification is further simplified for the machine operator. Furthermore, the closed contour has the effect that the workpiece part can be produced simply on any desired metal sheets. It is, for example, not necessary for the outer contour of a workpiece part, one or more sides of which corresponded to the edge of the metal sheet in the original production, to be produced at the edge of the metal sheet again. Accordingly, a sheet-metal plate without a high-quality edge can also be used for reproduction.

In a further aspect, the invention relates also to a CAM programming system, which has a sub-programming system for preparing the above-described extractable data sets, in particular individual part NC codes, and for preparing an NC program with such extractable data sets and/or a reproduction sub-system for preparing a new NC reproduction program from an NC program with such extractable data sets. The sub-system consequently consists of two parts, which can also work separately from one another. One part of the sub-system ensures that the CAM system, on preparation of the NC program, also produces and attaches extractable data sets in addition to the NC program. It is advantageous to effect this at this point because, in addition to the NC program for the machining of the sheet-metal plates, the CAD data sets are also available here, which simplifies individual part identification and the preparation of extractable data sets or individual part NC codes.

The other part of the sub-system extracts the additional data sets of the NC program and makes the data or NC codes contained therein, optionally after an adjustment (for example, of discharge or angular position), available to the CAM system for the production of an NC reproduction program. Access to and searches of the CAD data files are thereby advantageously avoided. This part of the reproduction sub-system can advantageously be integrated in the network in the CAD/CAM programming system originally used, which avoids the installation and maintenance of additional software on the MMC operating system, which helps to avoid compatibility problems, in particular in view of the many different computer and operating systems that are used. If, however, a CAD/CAM programming system is already installed on the control computer, it is advantageous if the sub-system is integrated into that programming system, whereby no additional program is necessary on the control computer. An independent CAM programming system for reproduction has the advantage that it is a substantially smaller computer program than a comprehensive CAM or CAD/CAM programming system, so that even low-performance control computers are able to execute it. Accordingly, even control computers without a network connection can prepare an NC program for reproduction. A control computer with a network connection saves having to construct a network connection to a computer with a CAD/CAM programming system, and thus also avoids the situation where reproduction cannot be started because, for example, the license for the CAD/CAM programming system is already in use.

It is advantageous for the reproduction sub-system to have an interrogation step for selection of the workpiece part(s) to be reproduced on the basis of the extracted data sets, because this makes the selection of the correct workpiece part(s) to be reproduced simple and convenient. The selection is particularly simple for the operator if, for the preparation of a selection list, the workpiece part geometry data are also supplied with the NC program and used. The selectable workpiece parts can be chosen from a selection list or directly from an image of the machined sheet-metal plate. The machine operator does not have to search for the appropriate CAD data sets from the large number of CAD data sets stored in the CAD file.

It is likewise advantageous to be able to adjust the size of the metal sheet, or starting material, that is to be used, because reproduction is thereby possible on any desired sheet-metal plates and not only on the remainder of the sheet of the last machining operation carried out.

Advantageously the extracted data sets, in particular individual part NC codes, are used by the CAM programming system to prepare a new NC reproduction program by processing and combining. As a result, without further intervention by the operator, an NC program can be generated that automatically produces all the selected workpiece parts that are to be reproduced and nests them on the sheet-metal plate in question.

It is particularly advantageous in the CAM system that the programming system, or the operator, does not have to specify again the tools (lasers, punching tools, shaping tools, etc.) and tool parameters that are to be used for the machining of a selected workpiece part, because they are already specified with the aid of the extractable data stored in the NC program and, in particular in the case of individual part NC codes, the associated NC text can be extracted directly and processed further to give a new NC reproduction program. It is thus ensured that the reproduced workpiece part is produced with the same quality as the original workpiece parts. It is therefore not necessary for the operator to know that, for example, a laser-cut workpiece part should be machined particularly slowly in order to ensure high quality, or with what settings the punching tools operate, for example in order to avoid excessive noise or to ensure particularly fast machining, because those parameters are retained by the further processing of the extracted data sets/NC text. Outlay in terms of programming and sources of error are thus avoided.

If the operator starts reproduction immediately after the actual production, the use of the same tools as in the original machining has the further advantage, in addition to the same quality, that losses of time for tool selection are avoided. Such losses of time occur in the case of punching operation in particular, where different punching tools can be used for the same machining, whereby there is a high probability that, when an NC reproduction program is prepared according to the prior art, an automatic suggestion of the machining strategy will lead to different tool combinations than those that are still fitted to the machine tool after the production that has just ended. In the programming system, the operator has the choice of matching the tools for machining to those still fitted to the machine tool, or of changing the tools on the machine tool.

In the process the same advantages are obtained as in the above-described NC program and CAD/CAM programming system.

Further advantages and advantageous embodiments of the subject-matter of the invention will be found in the description, the drawings and the claims. Likewise, the features mentioned above and those described hereinbelow can be used individually or in arbitrary combinations with one another. The embodiments shown and described are not to be interpreted as a conclusive listing but rather are given by way of example in order to describe the invention.

DETAILED DESCRIPTION

Figure 1:
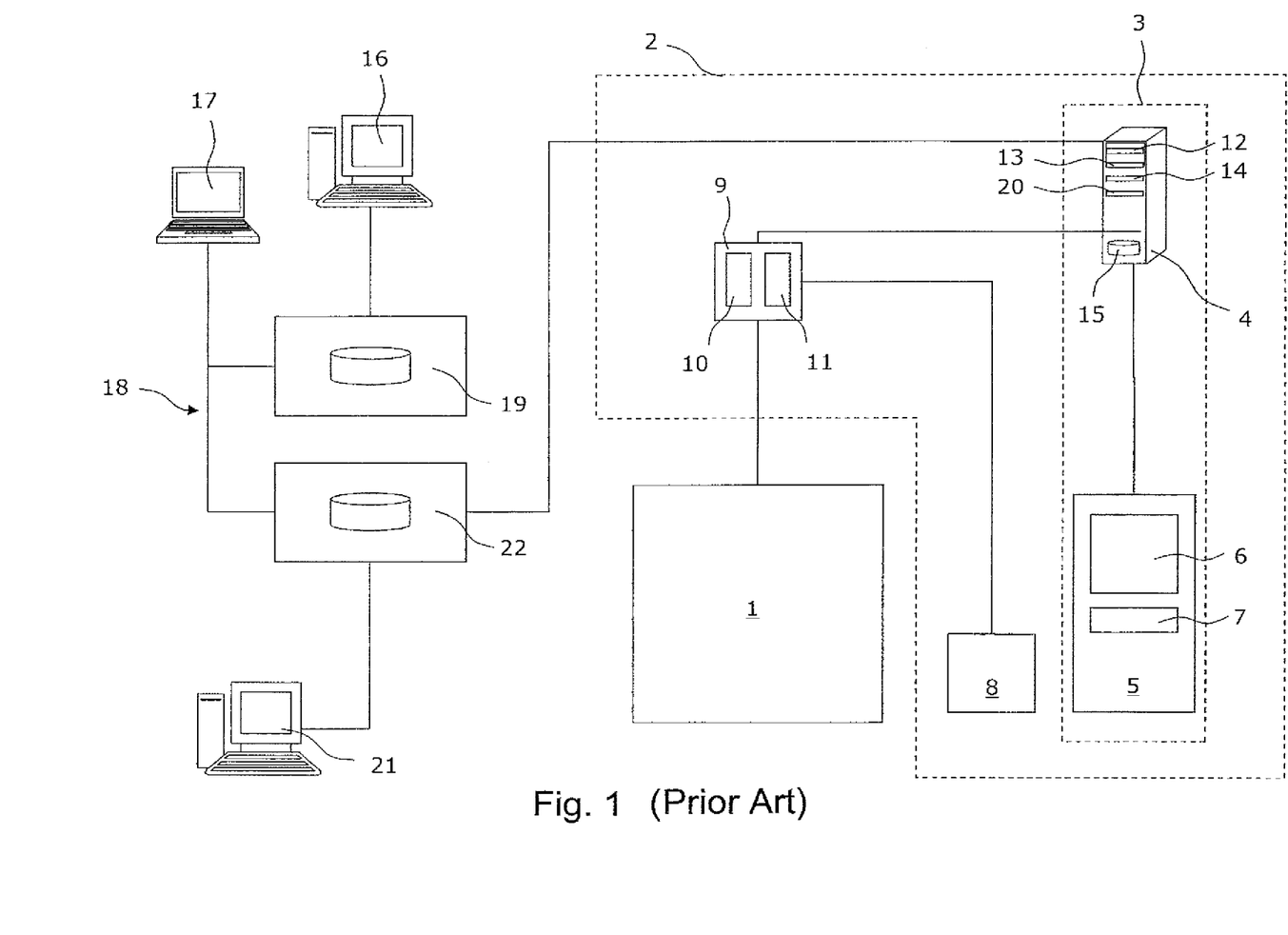
FIG. 1 shows a known device for controlling a machine tool.

FIG. 1 shows a known machine tool 1, which is controlled by an NC (numerical control) device 2. The control device 2 includes, on the hardware side, an MMC (Man Machine Communication) operating system 3 with a control computer 4 in the form of an industrial computer and an operating device 5 with a screen 6 as a display unit and an input unit 7, which can be in the form of a keyboard, mouse or touch panel, for example. The control device 2 further includes a machine control panel 8 for manually operating the machine tool 1, safety-related operations in particular being executed, and an NCU unit 9 (Numerical Control Unit) with integrated NC control unit 10 and SPC control unit 11. The NC and SPC control units 10, 11 can also be in the form of separate units.

On the software side, the control device 2 includes operating software 12 for controlling the machine tool 1, software modules 13 for task management, tool management and pallet management, a program management system 14 for managing control programs, and a data store 15, in which standard machining parameters for the control programs are stored. The expression "control program" includes, in addition to the NC program, all technology data that are released from the NC program into external data stores. In addition, further applications, such as, for example, a design system, a programming system or a combined design and programming system, can be installed on the control computer 4.

The production of a component on the machine tool 1 involves a design engineer, a software engineer and a machine operator, it being possible in some cases for those functions to be carried out by one or two collaborating persons. The design of the component is carried out by a design system 16 (CAD system) or a combined design and programming system 17 (CAD/CAM system), the abbreviations CAD and CAM standing for Computer Aided Design and Computer Aided Manufacturing. Finished design drawings are filed in a common CAD data file 19 provided for that purpose in a network 18, which file can be accessed by the software engineer if required.

The machine tool 1 is controlled via control programs, which are prepared by a programming system or manually on the operating device 5 of the MMC operating system 3. Programming systems know basic and specific NC functions and know which technology data are required and which rules apply for the machining They can accordingly define the machining automatically and generate a control program. In the exemplary embodiment shown in FIG. 1, there are installed, in addition to the combined design and programming system 17, a further programming system or combined design and programming system 20 in the control computer 4 and a programming system 21 (CAM system) in the network 18. The programming systems 17, 20, 21 are connected to a CAM data file 22, which can be accessed by the software engineer and the machine operator. The software engineer files the finished control programs in the CAM data file 22. The machine operator can access the CAM data file 22 and import the control programs from the CAM data file 22 into the program management system 14 of the control computer 4.

During programming, the software engineer specifies how a component is machined. He determines which tools are used, in which order machining takes place, and which machining parameters apply, for example, to the laser power and the feed speed. Programming systems assist the software engineer to find suitable machining parameters and machining strategies for his machining task. The information about suitable machining parameters and machining strategies is contained in so-called technology tables and systems of rules, which define the data store 15. In a technology table, suitable machining parameters for all relevant sizes that permit consistent machining are stored in dependence upon the type of material, the thickness of the material and the machining process. If required, technology tables are defined in dependence upon further parameters. These include, in the case of laser cutting, for example, the contour size, which is classified as small, medium or large, and the type of machine on which machining is to take place.

In the case of technology tables, a distinction is made between the machine producer's general technology tables, which are usually write-protected, and customer-specific technology tables. General technology tables are produced by the machine producer at great expense and supplied to the customers together with the numerical control device 2 of the machine tool 1. Customer-specific technology tables can be filed by a software engineer or machine operator and amended. In customer-specific technology tables, machining parameters matched to a specific customer's machining tasks are stored. The machining parameters stored in the general technology tables are referred to as "standard machining parameters". In order to determine them, machine producers carry out countless parameter variations and evaluate the machining results. The decision as to which machining parameters are stored in the technology table depends inter alia upon the boundary conditions. If machining is to be carried out with the highest possible machining quality, the machining parameters will be different than in the case of machining at the fastest possible speed. The machining parameters indicated by a machine producer in general technology tables generally represent a compromise between different boundary conditions, such as quality, consistency and speed.

Figure 2:
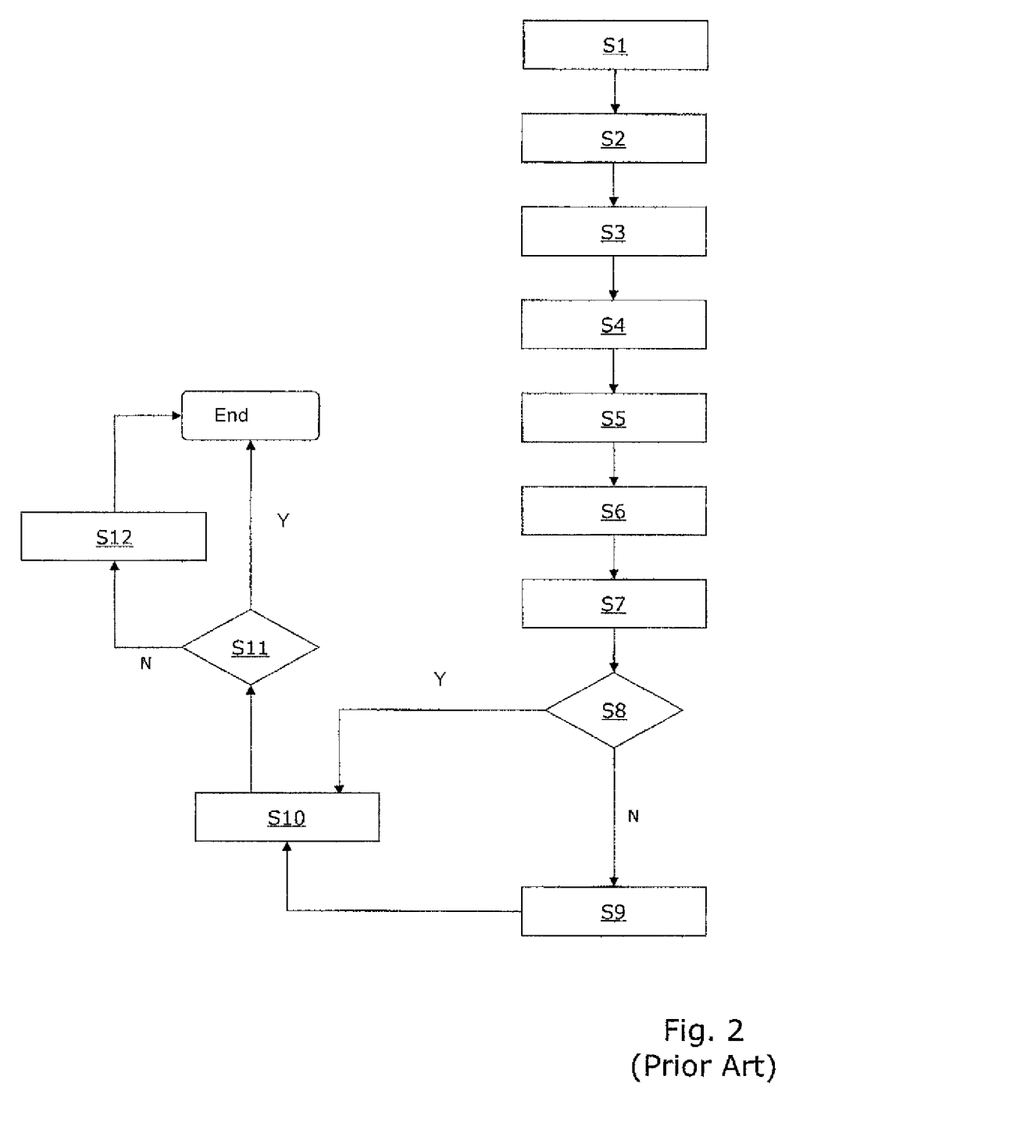
FIG. 2 shows a known process for reproduction on a machine tool.

FIG. 2 shows a process for reproduction according to the prior art. Once the machine operator has established that at least one workpiece part of the workpiece parts just produced must be reproduced, he opens in a step S1 a remote desktop connection to the CAM programming system 21 (shown in FIG. 1). From there, he accesses in a step S2 the CAD data file 19 and manually searches for the workpiece part geometry data (e.g. GEO or DXF data) of the workpiece parts that are to be reproduced. In a step S3, he specifies how many workpiece parts he must reproduce. Then, in a step S4, the machine operator specifies the type of metal sheet he would like to use. He must ensure that he uses the same metal sheet as requested in the order. In a step S5, he enters the size of the sheet-metal plate used, so that in a step S6 the workpiece parts to be reproduced are nested onto the sheet-metal plate manually or by the CAM programming system 21. In a step S7, the CAM programming system 21 produces a machining proposal for the operator, in which the various tools used, the tool parameters thereof (punching pressure, stroke type, laser energy and frequency, feed speed, etc.) and the mode of discharge are specified. In a step S8, the machine operator determines whether he wishes to make changes to the tool selection or the machining parameters. If he is not satisfied with the automatic tool selection (N in S8), for example if in the case of punching operations he plans to use the tools already fitted to the machine tool 1, and would like to save himself a refitting operation, he can adjust this in step S9. In any case, he must check in step S8 whether the machining is planned according to the quality requirements of the order. If that is not the case (N in S8), he can also adjust the standard operating parameters in step S9 and thus, for example by reducing the laser power and lowering the machining speed, ensure a higher quality of the workpiece parts. When all adjustments have been made by the machine operator in step S9, or if no changes were necessary (Y in S8), the machine operator can produce an NC program in step S10 with the aid of the CAM programming system 21 and transmit it to the control computer 4 of the machine tool 1. In a step S11, the machine operator starts execution of the NC program. It is then checked whether the tools are fitted according to the NC program. If that is the case, execution begins (Y in S11) and the process of reproduction ends. If it is established that the correct tools are not yet fitted, the machine operator must rectify the situation in a step S12, whereupon machining according to the NC program begins.

Figure 3A:
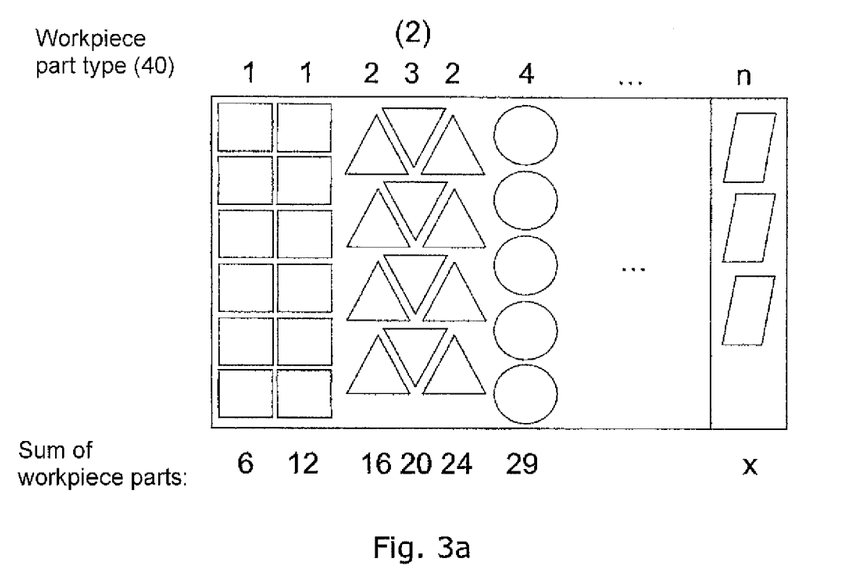
FIG. 3a shows a sheet-metal plate with nested workpiece part geometries that are to be produced.

FIG. 3a shows by way of example a sheet-metal plate with workpiece parts nested thereon, including a number of workpieces part types 40. The total number of good parts is x and the number of different workpiece part types 40 is n. It is thereby possible for workpiece part type 40,3 (upward triangle) to be treated as equivalent to workpiece part type 40,2 (downward triangle), or not.

Figure 3B:
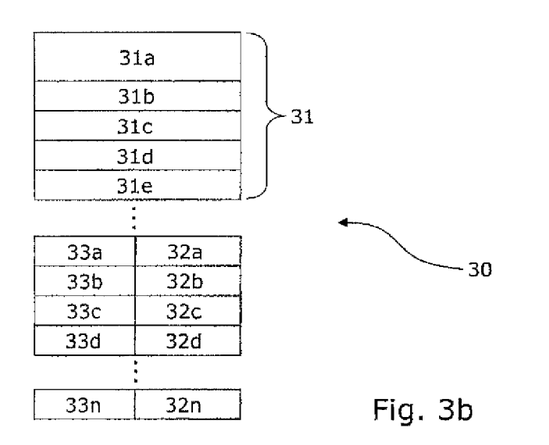
FIG. 3b shows a constructed NC program.

FIG. 3b shows the structure of an NC program 30. The NC program 30 contains the same basic information as an NC program 31 according to the prior art, which in this exemplary embodiment shows the NC program structure for a TRUMPF machine tool. The NC program 31 has a main program 31a and sub-programs 31b, 31c, etc. The main program 31a prepares the various tools for use and then calls up the associated sub-programs. In the case of punching operations, the sub-programs contain all the movements and punching strokes of an individual punching tool. These are carried out in full before returning to the main program. In the case of laser operations, the relative movements for cutting precisely one contour are stored in each sub-program.

Accordingly, it is generally not possible to clearly identify from an NC program 31 according to the prior art the good parts produced thereby. In the case of laser machining, a cut contour can correspond to the outer contour of a good part. If, however, multiple parts are nested into one another, the inner parts could be both waste and good parts. Identification of good parts also quickly becomes unclear if there are common separating cuts between workpiece parts or if the edge of the metal sheet corresponds to one or more sides of the outer contour of the workpiece part. For example, in the case of workpiece n in FIG. 3a, it is not immediately apparent whether the vertical cut is merely an edging cut or whether the large rectangle formed by that cut corresponds to the good part and, if so, whether the parallelograms are then good parts or waste.

The NC program is additionally expanded at least by the extractable data sets 32n, in which all the tools and tool steps necessary for the production of an individual, clearly defined workpiece part of the nth workpiece part type 40,n are stored. These extractable data sets 32n can be in the form of pre-produced individual part NC codes, that is to say the above-mentioned information relating to the workpiece part is at least partly already compiled in the form of NC program parts. These NC program parts can be adopted virtually unchanged when preparing an NC reproduction program. The only adjustments required are, for example, the entry of relative displacements of the coordinate information for nesting. The machining parameters can also be indicated, so that it is not necessary to use only standard machining parameters for the reproduction machining operations. The extractable data set 32n for a workpiece part type 40,n can clearly define the workpiece part to be produced thereby by a closed outer contour. Advantageously, geometry data 33n for each workpiece part type 40 are also stored, which are used in the process of FIG. 5.

Figure 4:
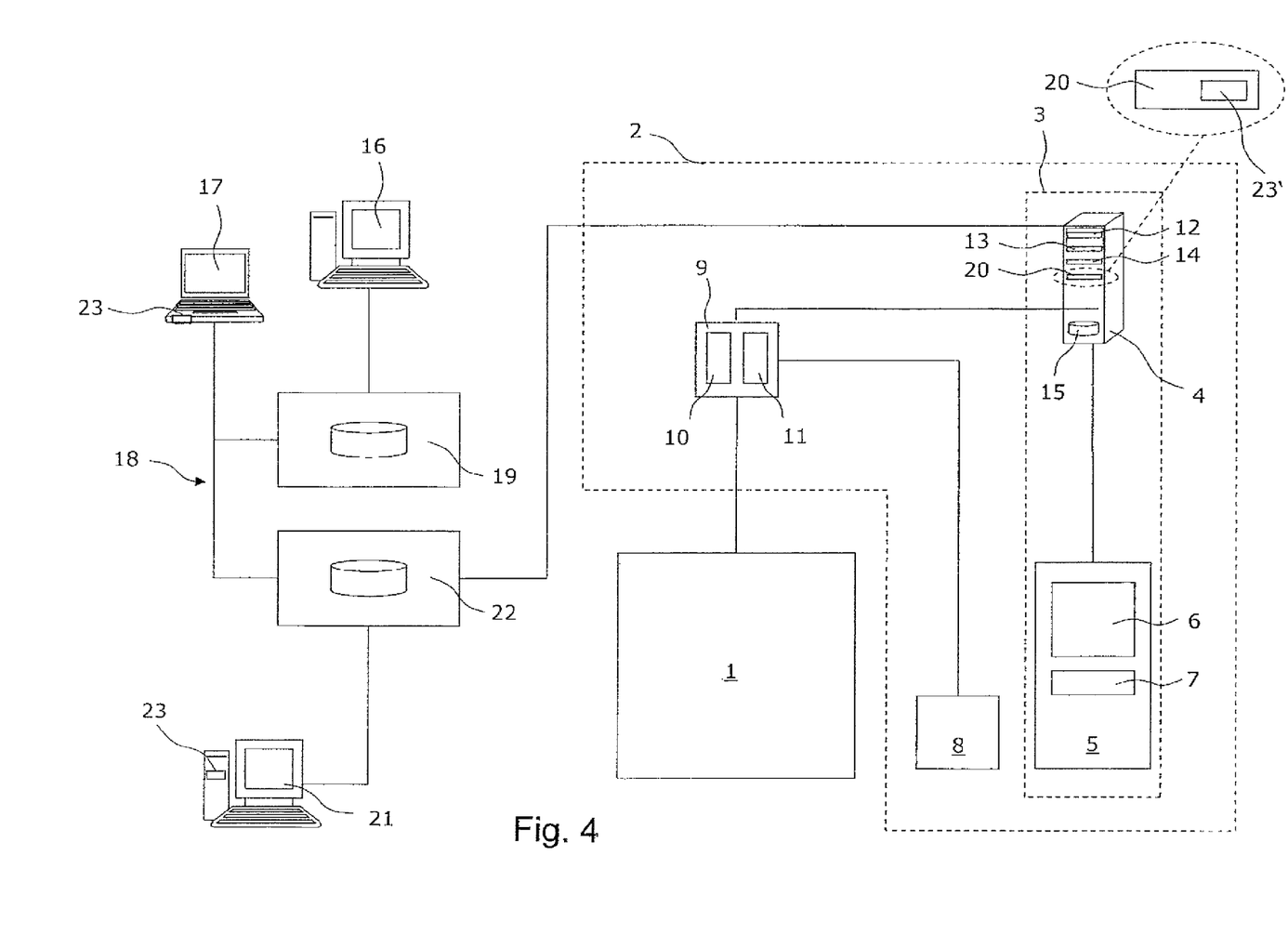
FIG. 4 shows a device for controlling a machine tool having sub-programming systems or reproduction sub-systems.

FIG. 4 shows the device for controlling the machine tool 1 of FIG. 1 including the sub-systems 23 and 23'. The sub-programming system 23 expands the programming systems 17 and 21 by the function of producing an NC program 30 shown in FIG. 3b for simplified reproduction. In contrast to FIG. 1, the CAM system 20 can be a fully functioning programming system or combined programming and design system, but also a simplified CAM system which is used merely to prepare the NC reproduction programs. When it is a simplified CAM system, the reproduction sub-system 23' does not need to have the functionality of preparing an NC program 30 according to FIG. 3b. The sub-system 23' has, however, the function of reading out an NC program 30 according to FIG. 3b and producing an associated NC reproduction program therefrom by CAM system 20 in a process. It is not necessary for both sub-systems 23 to have this function, but it is possible likewise to integrate them. This is advantageous if there are other machine tools in the network which do not have a CAM system 20 but can access the programming systems 17 and 21.

In the following, a sub-programming system refers to a sub-system 23/23' which in any case has the function of preparing an NC program 30 according to FIG. 3b. A reproduction sub-system is a sub-system 23/23' which in any case has the function of using extractable data sets 32n to prepare a new NC reproduction program. However, they can both optionally also have the respective other functionality.

Figure 5:
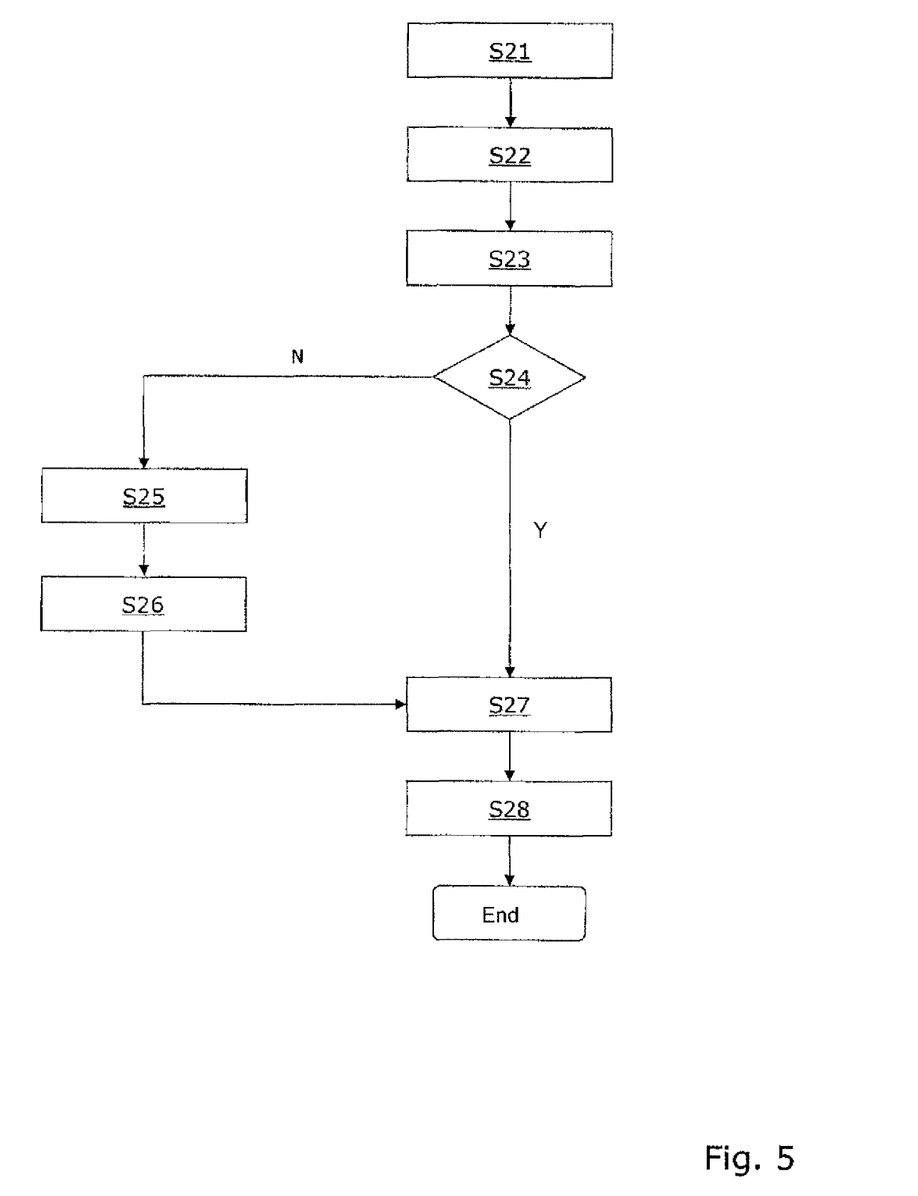
FIG. 5 shows a process for simplified reproduction on a machine tool using the NC program of FIG. 3b.

FIG. 5 shows a process for reproduction disclosed herein. Once the machine operator has established that he must reproduce at least one workpiece part of the workpiece parts just produced, he starts the reproduction process in a step S21 by pushing a button on the MMC operating system. In a step S22, the reproduction sub-system 23' or 23 (after establishing a connection to one of the programming systems in the network) allows the machine operator to select from the workpiece parts produced with the last NC program for reproduction, either by listing the workpiece part geometry data 33n of all the workpiece types 40 produced, if available, or by displaying the individual workpiece part types 40 on the screen 6 on the basis of their machining operations defined by the extractable data sets 32n, or individual part NC codes. The machine operator simply has to select the parts for reproduction from the currently relevant workpiece parts. It is conceivable to select the workpiece parts from a list or directly from an image of the machined sheet-metal plate.

In a step S23, the machine operator can indicate the desired number of selected workpiece parts for reproduction. Optionally, the sub-system used, with its associated CAM system, can then try in a step S24 to nest on the remainder of the metal sheet the necessary machining steps from the extractable data sets 32n, or individual part NC codes, for all the workpiece parts that are to be reproduced, taking into account the number. If that test is not to be carried out, or if nesting is not possible (N in S24), the size of the metal sheet to be used for reproduction is entered by the operator in step S25. The interrogation thereby indicates what type of metal sheet is to be used, because that is already specified in the original NC program 30. In a step S26, the workpiece parts that are to be reproduced are nested on the metal sheet by the CAM system on the basis of the extractable data sets 32n, or individual part NC codes or workpiece part geometry data 33n. In a step S27, the CAM system then produces a new NC reproduction program from the extractable data sets 32n, or individual part NC codes, and the other necessary information of the NC program 30 used previously, and copies it, if necessary, to the control computer 4 of the machine tool 1. The extractable data sets 32n, or individual part NC codes 32n, may or may not also contain information on the discharge of the workpiece part in question. In order to keep reproduction quick and error-free, or if no discharge information is present, manual discharge of the part is programmed automatically. Although the programming of automatic removal is possible, it is generally not worthwhile because only a small number of workpiece parts have to be reproduced. If information relating to the discharge of the workpiece parts is present, it can be used, but the workpiece parts that are to be reproduced must then be nested in the same angular position in which they are first laid out. In order to keep nesting as simple as possible, however, the workpiece parts are generally not rotated, so that, as shown in FIG. 3a, upward triangles can be regarded as a different workpiece part type 40,2 from downward triangles (workpiece part type 40,3). When using individual part NC codes 32n, the CAM system can prepare the NC reproduction program that is to be prepared for the reproduction for the most part by simply processing (e.g. adapting the individual part coordinates to sheet metal coordinates) and combining the individual part NC codes.

Finally, in a step S28, the machine operator can start execution of the NC reproduction program without further preparations being necessary, because the same parameters and tools as in the original NC program 30 are used and, for example, refitting of the machine tool 1 is accordingly not necessary. The process is thereby ended.

Figure 6:
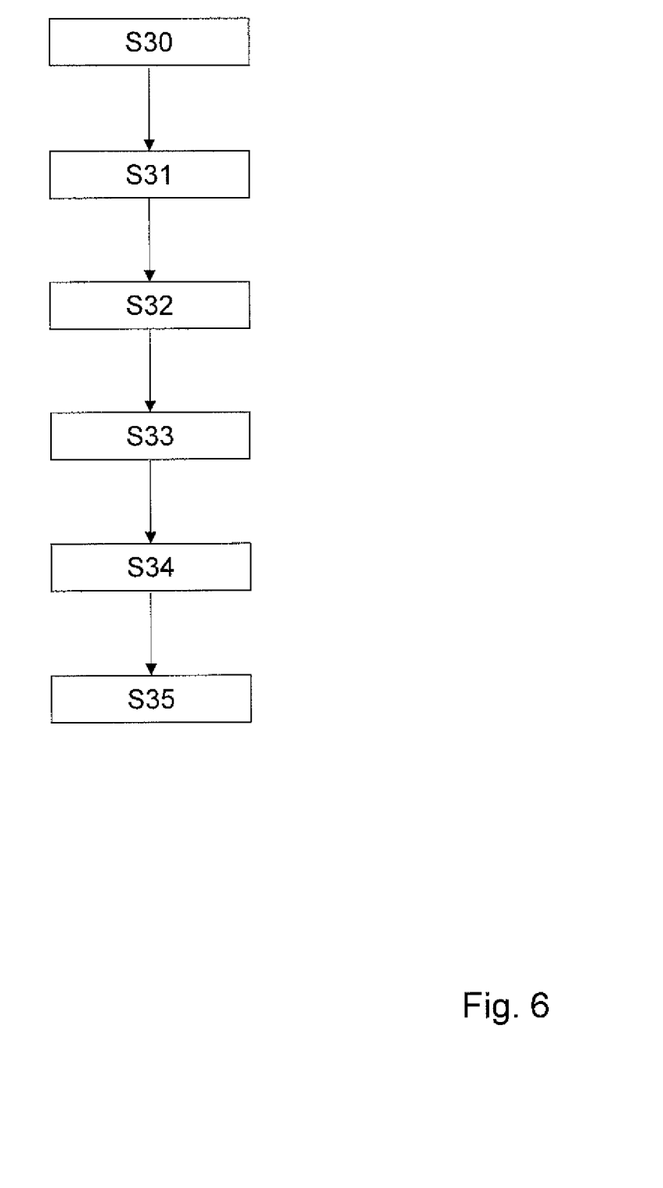
FIG. 6 shows a process for constructing an NC program.

A method of implementing the system described herein is shown in FIG. 6. At step S30, the CAM program 20 receives the data that represents a workpiece part type 40,n to be produced on a machine tool 1 for machining flat starting materials. At S31 a first numerical control program which is adapted for producing the workpiece part type from a flat starting material on the machine tool is prepared. At step S32 one of the sub-systems 23/23' attaches one or more extractable data sets 32n prepared from the received data to the first numerical control program, wherein the extractable data sets 32n represent one or more parameters including the tools, tool steps and associated machining parameters for producing the workpiece part type on the machine tool. The sub-system 23/23' extracts the extractable data sets 32n from the attached first numerical control program for adjusting the one or more parameters (step S33) and integrates the adjusted one or more parameters into a second numerical control program at step S34. Finally the sub-system 23/23' provides the second numerical control program to the control computer 4 of the machine tool 1 at step S35.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

In some implementations, the engines described herein can be separated, combined or incorporated into a single or combined engine. The engines depicted in the figures are not intended to limit the systems described here to the software architectures shown in the figures.

A number of implementations have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method, comprising:
receiving data that represents a workpiece part type to be produced on a machine tool in the form of a laser machine, punching machine, or combined laser/punching machine for machining flat starting materials;
preparing a first numerical control program which is adapted for producing the workpiece part type from a flat starting material on the machine tool;
attaching one or more extractable data sets prepared from the received data to the first numerical control program, wherein the extractable data sets represent one or more parameters including the tools, tool steps and associated machining parameters for producing a single workpiece of the workpiece part type on the machine tool;
extracting the extractable data sets from the attached first numerical control program;
integrating the extracted data sets into a second numerical control program which is adapted for reproducing a single workpiece of the workpiece part type from a flat starting material on the machine tool; and providing the second numerical control program to the machine tool.

2. The method according to claim 1, wherein the flat starting materials comprise metal sheets.

3. The method according to claim 1, wherein the extractable data sets comprise individual part numerical control codes.

4. The method according to claim 1, wherein the extractable data sets comprise workpiece part geometry data.

5. The method according to claim 1, comprising receiving from a user a selection of the workpiece part type to be produced from a list of workpiece parts on the basis of the extractable data sets.

6. The method according to claim 1, comprising receiving from a user a number of workpiece parts of the selected workpiece part type to be produced.

7. The method according to claim 1, comprising receiving from a user a selection of the size of the flat starting material to be used for the workpiece part type to be produced.

8. The method according to claim 1, comprising combining the extractable data sets and other information necessary for the production of the workpiece part type to prepare a new numerical control production program.

9. The computer-implemented method of claim 1, comprising extracting the extractable data sets from the first numerical control program for adjusting the one or more parameters.

10. An electronic system comprising:
memory to store instructions that are executable; and
one or more processing devices to execute the instructions to perform operations comprising:
receiving data that represents a workpiece part type to be produced on a machine tool in the form of a laser machine, punching machine, or combined laser/punching machine for machining flat starting materials;
attaching one or more extractable data sets prepared from the received data to a first numerical control program, which is adapted for producing the workpiece part type from a flat starting material on the machine tool, wherein the extractable data sets represent one or more parameters including the tools, tool steps and associated machining parameters for producing a single workpiece of the workpiece part type on the machine tool;
extracting the extractable data sets from the attached first numerical control program;
integrating the extracted data sets into a second numerical control program which is adapted for reproducing a single workpiece of the workpiece part type from a flat starting material on the machine tool; and
providing the second numerical control program to the machine tool.

11. The electronic system according to claim 10, wherein the flat starting materials comprise metal sheets.

12. The electronic system according to claim 10, wherein the extractable data sets comprise individual part numerical control codes.

13. The electronic system according to claim 10, wherein the extractable data sets comprise workpiece part geometry data.

14. The electronic system according to claim 10, comprising receiving from a user a selection of the workpiece part type to be produced from a list of workpiece parts on the basis of the extractable data sets.

15. The electronic system according to claim 10, comprising receiving from a user a number of workpiece parts of the selected workpiece part type to be produced.

16. The electronic system according to claim 10, comprising receiving from a user a selection of the size of the flat starting material to be used for the workpiece part type to be produced.

17. The electronic system according to claim 10, comprising combining the extractable data sets and other information necessary for the production of the workpiece part type to prepare a new numerical control production program.

18. The electronic system of claim 10, comprising extracting the extractable data sets from the first numerical control program for adjusting the one or more parameters.

19. One or more non-transitory machine-readable storage media storing instructions that are executed to perform operations comprising:
receiving data that represents a workpiece part type to be produced on a machine tool in the form of a laser machine, punching machine, or combined laser/punching machine for machining flat starting materials;
attaching one or more extractable data sets prepared from the received data to a first numerical control program, which is adapted for producing the workpiece part type from a flat starting material on the machine tool, wherein the extractable data sets represent one or more parameters including the tools, tool steps and associated machining parameters for producing a single workpiece of the workpiece part type on the machine tool;
extracting the extractable data sets from the attached first numerical control program;
integrating the extracted data sets into a second numerical control program which is adapted for reproducing a single workpiece of the workpiece part type from a flat starting material on the machine tool; and
providing the second numerical control program to the machine tool.

20. The one or more non-transitory machine-readable storage media of claim 19, wherein the one or more non-transitory machine-readable storage media store instructions that are executed to perform operations, and wherein the flat starting materials comprise metal sheets.

21. The one or more non-transitory machine-readable storage media of claim 19, wherein the one or more non-transitory machine-readable storage media store instructions that are executed to perform operations, wherein the extractable data sets comprise individual part numerical control codes.

22. The one or more non-transitory machine-readable storage media of claim 19, wherein the one or more non-transitory machine-readable storage media store instructions that are executed to perform operations, wherein the extractable data sets comprise workpiece part geometry data.

23. The one or more non-transitory machine-readable storage media of claim 19, wherein the one or more non-transitory machine-readable storage media store instructions that are executed to perform operations, comprising receiving from a user a selection of the workpiece part type to be produced from a list of workpiece parts on the basis of the extractable data sets.

24. The one or more non-transitory machine-readable storage media of claim 19, wherein the one or more non-transitory machine-readable storage media store instructions that are executed to perform operations, comprising receiving from a user a number of workpiece parts of the selected workpiece part type to be produced.

25. The one or more non-transitory machine-readable storage media of claim 19, wherein the one or more non-transitory machine-readable storage media store instructions that are executed to perform operations, comprising receiving from a user a selection of the size of the flat starting material to be used for the workpiece part type to be produced.

26. The one or more non-transitory machine-readable storage media of claim 19, wherein the one or more non-transitory machine-readable storage media store instructions that are executed to perform operations, comprising combining the extractable data sets and other information necessary for the production of the workpiece part type to prepare a new numerical control production program.

27. The one or more non-transitory machine-readable storage media of claim 19, comprising extracting the extractable data sets from the first numerical control program for adjusting the one or more parameters.

28. A process for the preparation of a new NC reproduction program for one or more workpiece parts that are to be reproduced on a machine tool in the form of a laser machine, punching machine, or combined laser/punching machine for machining flat starting materials wherein the workpiece parts to be reproduced are selected from a list of workpiece part types previously produced using an NC program, wherein extractable data sets associated with the selected, previously produced workpiece part types are read out from the NC program and wherein a new NC reproduction program for the workpiece parts that are to be reproduced is prepared on the basis of the extracted data sets.

29. The process for the preparation of a new NC reproduction program according to claim 28, wherein the flat starting materials comprise metal sheets.

30. A computer program product comprising code for the execution of all the steps of the process according to claim 29, wherein the program is run on a data processing system.

31. A numerical control (NC) program for a machine tool in the form of a laser machine, punching machine, or combined laser/punching machine for machining flat starting materials, wherein the NC program has for each of multiple different workpiece parts that it can produce one or more extractable data sets storing tools, tool steps and associated machining parameters for producing an individual one of the workpiece parts.

32. The NC program according to claim 31, wherein the extractable data sets for each different workpiece part define a closed outer contour of the workpiece part.

\* \* \* \* \*